United States Patent
Zou et al.

(10) Patent No.: US 12,461,862 B2
(45) Date of Patent: Nov. 4, 2025

(54) ADDRESS TRANSLATION AT A TARGET NETWORK INTERFACE DEVICE

(71) Applicant: Intel Corporation, Santa Clara, CA (US)

(72) Inventors: Yi Zou, Portland, OR (US); Arun Raghunath, Portland, OR (US); Scott D. Peterson, Beaverton, OR (US); Sujoy Sen, Beaverton, OR (US); Yadong Li, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 894 days.

(21) Appl. No.: 17/359,554

(22) Filed: Jun. 26, 2021

(65) Prior Publication Data

US 2021/0326270 A1 Oct. 21, 2021

(51) Int. Cl.
  *G06F 12/1072* (2016.01)
  *G06F 3/06* (2006.01)
  *G06F 12/02* (2006.01)

(52) U.S. Cl.
  CPC ........ *G06F 12/1072* (2013.01); *G06F 3/0604* (2013.01); *G06F 3/0638* (2013.01); *G06F 3/067* (2013.01); *G06F 12/0292* (2013.01); *G06F 2212/65* (2013.01); *G06F 2212/7201* (2013.01)

(58) Field of Classification Search
  CPC .. G06F 12/1072; G06F 3/0604; G06F 3/0638; G06F 3/067; G06F 12/0292; G06F 2212/65; G06F 2212/7201
  See application file for complete search history.

(56) References Cited

U.S. PATENT DOCUMENTS

| | | | |
|---|---|---|---|
| 10,592,162 B2 | 3/2020 | Peterson et al. | |
| 2002/0184392 A1* | 12/2002 | Parthasarathy | H04L 67/14 709/249 |
| 2019/0042091 A1 | 2/2019 | Raghunath et al. | |

(Continued)

OTHER PUBLICATIONS

An article titled "InfiniBand: An Introduction + Simple IB verbs program with RDMA WRite" available online at https://blog.zhaw.ch/icclab/infiniband-an-introduction-simple-ib-verbs-program-with-rdma-write/ that notes RDMA is based on translation of logical addresses (Year: 2013).*

*Primary Examiner* — Tim T Vo
*Assistant Examiner* — Janice M. Girouard
(74) *Attorney, Agent, or Firm* — Compass IP Law PC

(57) ABSTRACT

Examples described herein relate to a network interface device comprising circuitry to receive an access request with a target logical block address (LBA) and based on a target media of the access request storing at least one object, translate the target LBA to an address and access content in the target media based on the address. In some examples, translate the target LBA to an address includes access a translation entry that maps the LBA to one or more of: a physical address or a virtual address. In some examples, translate the target LBA to an address comprises: request a software defined storage (SDS) stack to provide a translation of the LBA to one or more of: a physical address or a virtual address and store the translation into a mapping table for access by the circuitry. In some examples, at least one entry that maps the LBA to one or more of: a physical address or a virtual address is received before receipt of an access request.

17 Claims, 10 Drawing Sheets

(56) References Cited

U.S. PATENT DOCUMENTS

| | | | |
|---|---|---|---|
| 2019/0042144 A1* | 2/2019 | Peterson | G06F 3/0635 |
| 2019/0050602 A1* | 2/2019 | Sela | G11C 7/24 |
| 2020/0272579 A1* | 8/2020 | Humphrey | G06F 9/4856 |
| 2020/0293464 A1* | 9/2020 | Mizrahi | G06F 13/1668 |

* cited by examiner

ADDRESS TRANSLATION AT A TARGET NETWORK INTERFACE DEVICE

The Non-Volatile Memory Express (NVMe) Specification describes a system for accesses to data storage systems through a Peripheral Component Interconnect Express (PCIe) port. NVMe is described for example, in NVM Express™ Base Specification, Revision 1.3c (2018), as well as predecessors, successors, and proprietary variations thereof, which are incorporated by reference in their entirety. NVMe allows a host device to specify regions of storage as separate namespaces. A namespace can be an addressable domain in a non-volatile memory having a selected number of storage blocks that have been formatted for block access. A namespace can include an addressable portion of a media in a solid state drive (SSD), or a multi-device memory space that spans multiple SSDs or other data storage devices. A namespace ID (NSID) can be a unique identifier for an associated namespace. A host device can access a particular non-volatile memory by specifying an NSID, a controller ID and an associated logical address for the block or blocks (e.g., logical block addresses (LBAs)).

Distributed scale-out block storage offers services such as thin provisioning, capacity scale-out, high availability (HA), and self-healing. These services can be offered by a software defined storage (SDS) stack running on a cluster of commodity processors. SDS can expose logical volumes that client applications can connect to via a block driver. SDS can break the logical volume into shards which are stored internally as objects within the cluster and objects can be stored as spread out across the cluster to span different failure domains. Further, SDS enables HA by creating multiple replicas or erasure-coded objects.

Data can be copied or stored to virtualized storage nodes or accessed using a protocol such as NVMe over Fabrics (NVMe-oF) whereby a client block I/O request is sent using NVMe-oF. When the request is received at the storage node, the request can be processed through a SDS software stack (e.g., Ceph object storage daemon (OSD) software stack), which can perform protocol translation, before the request is provided to the storage device.

Consequently, when a client accesses a certain range within the logical volume, the cluster-internal object, which maps to this volume extent, as well as the server where it is currently stored, can be determined. Typically, this is done using a client-side software component, which uses a custom-made protocol to communicate with the distributed storage backend. Cloud service providers (CSPs) have created proprietary solutions customized to improve access to their individual infrastructures and also include custom hardware ingredients such as Amazon Web Services (AWS) Nitro SmartNIC, Alibaba X-Dragon chip, and Azure Corsica ASIC.

When compared to the industry standard high performance NVMe-oF block protocol, scale-out block storage services can incur an order of magnitude higher latency. For example, while access latencies over NVMe-oF can be in the order of 10-100 s of microseconds, typical scale-out block storage provide millisecond access latencies. Accordingly, deploying block storage can involve a choice between low latency with limited storage services or additional services with scale-out benefits, but at higher latency.

DETAILED DESCRIPTION

A network interface device can provide an access request with a logical block address (LBA) range to read-from or write-to a target storage device or pool or target memory device or pool. With LBA, an address of a block of data stored in a media is identified using a linear addressing scheme where block addresses are identified by integer indices, with a first block being LBA 0, and so forth. A target network interface device can receive the access request and (a) access a conversion table to convert the LBA ranges to physical address ranges in the target storage device or pool or target memory device or pool or (b) request a mapping of LBA ranges to physical address ranges and store the mapping in the conversion table. In a case where a mapping between an LBA range and a physical address range is not yet mapped in the conversion table, a data plane of a software defined storage (SDS) stack can be accessed to provide the mapping. Some implementations of a target network interface device can potentially reduce end-to-end latency for block storage requests from request to completion of the request and also allow for use of one or more aforementioned storage service. A client that requests the access request need not be modified to perform LBA to an SDS internal format (e.g., object format) conversion and can rely, instead, on the target network interface device to perform the conversion. Access requests can be transmitted using NVMe-oF directly to a landing NVMe storage device, removing any intermediate protocol translation such as block-to-physical address or physical address-to-block using an SDS protocol or proprietary storage protocols (e.g., Ceph).

Figure 1:
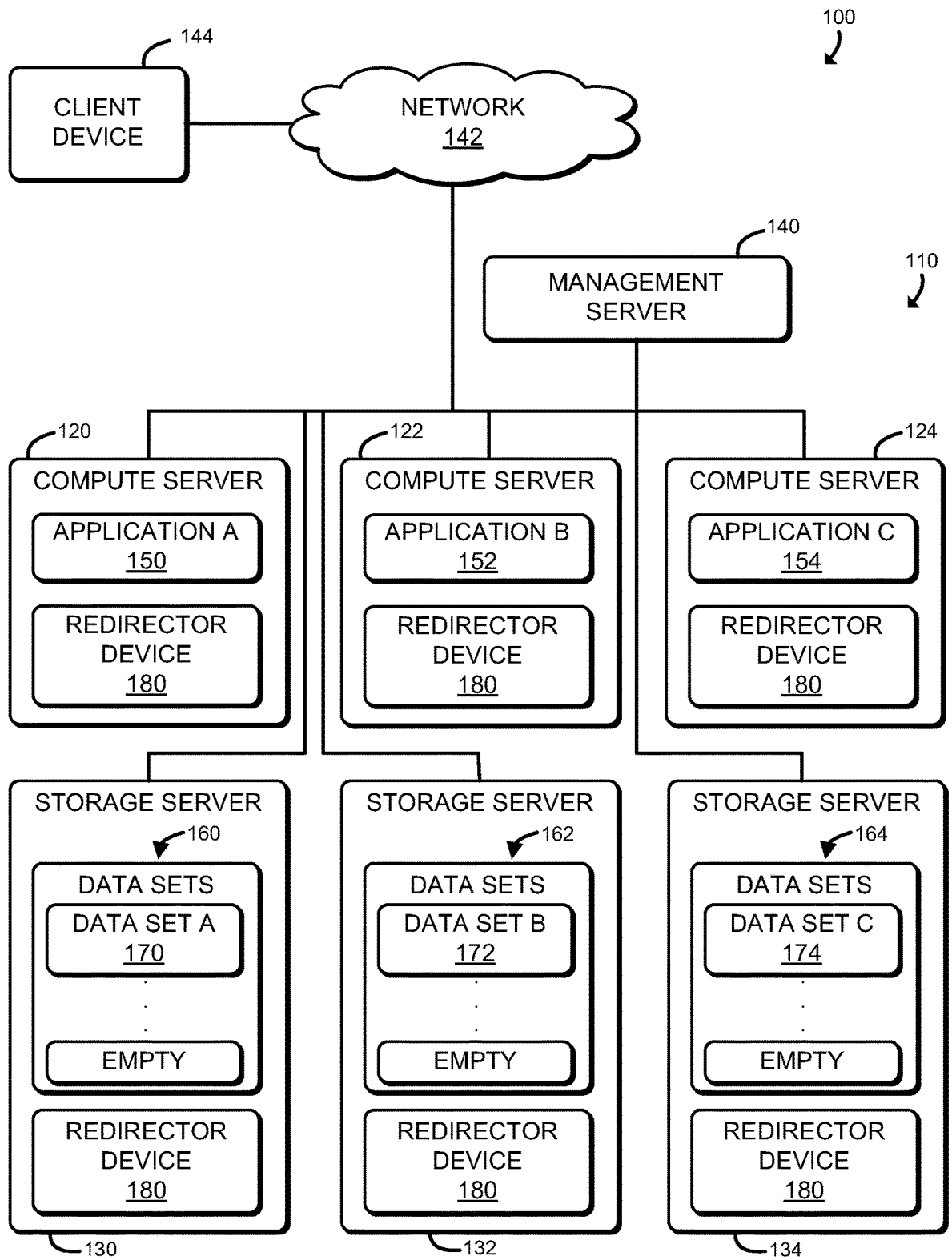
FIG. 1 is a diagram of an embodiment of a system for providing distributed storage location hinting for non-volatile memories.

FIG. 1 depicts a system 100 for providing distributed storage location hinting includes a set of compute devices 110 including compute servers 120, 122, 124 and storage servers 130, 132, 134. Compute servers 120, 122, 124 and the storage servers 130, 132, 134 can be in communication with a management server 140, which, in operation, may assign applications (e.g., processes, sets of operations, etc.) 150, 152, 154 to the compute servers 120, 122, 124 to execute on behalf of a client device 144. During execution, an application (e.g., the application 150) may request access to a data set 160, 162, 164, 170, 172, 174 that is available in one or more copies (e.g., replicas) in one or more of the storage servers 130, 132, 134. A compute device 110 can include a redirector device 180, implemented as any device or circuitry (e.g., a co-processor, an application specific integrated circuit (ASIC), etc.) configured to identify, from a set of routing rules, a target device (e.g., a storage server, another redirector device, etc.), where the request to access a particular data set is to be sent.

A redirector device 180 may store a set of default routing rules (e.g., provided by the management server 140, a configuration file, application program interface (API), command line interface (CLI), or another source) that may not precisely identify the location of each data set and instead, provides general direction as to where requests could be sent. However, over time (e.g., as data access requests are communicated through the system 100), redirector devices 180 in the system 100 share information (e.g., hints) as to the precise locations of the data sets and thereby reduce the number of hops (e.g., rerouting of data access requests among the redirector devices 180) to enable requests to be sent more directly to the precise locations (e.g., the storage server 130, 132, 134 that actually stores a particular data set). If a redirector device 180 receives a data access request and determines (e.g., from a set of routing rules utilized by that redirector device 180) that the data access request could be sent to another target device (e.g., a redirector device 180 in a storage server 132 that actually stores the requested data set), redirector device 180 can forward the request to the other target device (the "downstream target device"). Further, the present redirector device 180 can send the identity of the downstream target device (e.g., the target device to which the request is to be forwarded) upstream to the initiator device (e.g., the device that sent the data access request to the present redirector device 180) for future reference. As data sets are moved between storage servers 130, 132, 134, the redirector devices 180 can propagate updates to their routing rules using the scheme described above. As such, by automatically propagating updates to the locations of the data sets among redirector devices 180, the system 100 can provide greater reliability over typical distributed storage systems in which changes to the locations of data sets can result in failures to access the data sets.

Figure 2:
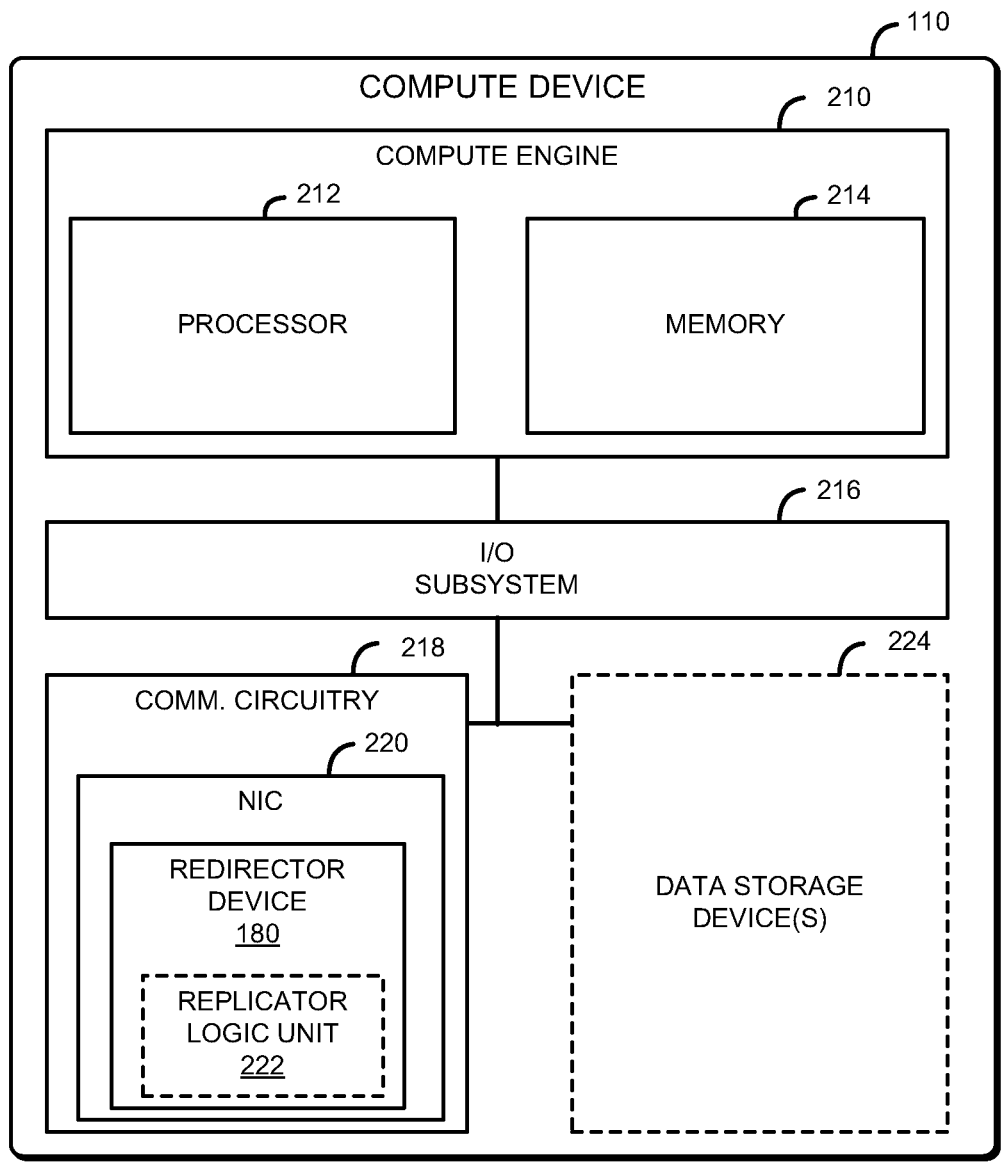
FIG. 2 is a block diagram of an embodiment of a compute device included in the system of FIG. 1.

FIG. 2 depicts an example compute device 110 (e.g., a compute server 120, 122, 124, a storage server 130, 132, 134, etc.) includes a compute engine (also referred to herein as "compute engine circuitry") 210, an input/output (I/O) subsystem 216, communication circuitry 218, and may include (e.g., in the case of a storage server) one or more data storage devices 224. Of course, in other embodiments, the compute device 110 may include other or additional components, such as those commonly found in a computer (e.g., a display, peripheral devices, etc.). One or more of the components may be any distance away from another component of the compute device 110 (e.g., distributed across a data center). The compute engine 210 may be embodied as any type of device or collection of devices capable of performing various compute functions described below. Compute engine 210 may be embodied as a single device such as an integrated circuit, an embedded system, a field-programmable gate array (FPGA), a system-on-a-chip (SOC), or other integrated system or device. Compute engine 210 includes or is embodied as a processor 212 and a memory 214. For example, the processor 212 may be embodied as a multi-core processor(s), a microcontroller, or other processor or processing/controlling circuit. In some embodiments, the processor 212 may be embodied as, include, or be coupled to a field programmable gate array (FPGA), an application specific integrated circuit (ASIC), reconfigurable hardware or hardware circuitry, or other specialized hardware to facilitate performance of the functions described herein.

Main memory 214 may be embodied as any type of volatile (e.g., dynamic random-access memory (DRAM), etc.) or non-volatile memory or data storage capable of performing the functions described herein. Main memory 214 may be as a memory pool or memory node.

Compute engine 210 can be communicatively coupled to other components of the compute device 110 via the I/O subsystem 216, which may be embodied as circuitry and/or components to facilitate input/output operations with compute engine 210 (e.g., with processor 212 and/or main memory 214) and other components of compute device 110. For example, I/O subsystem 216 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. I/O subsystem 216 may form a portion of a system-on-a-chip (SoC) and be incorporated, along with one or more of processor 212, main memory 214, and other components of the compute device 110, into compute engine 210. I/O subsystem 216 supports a NVMe over fabrics (NVMe-oF) protocol.

Communication circuitry 218 may be embodied as any communication circuit, device, or collection thereof, capable of enabling communications over network 142 between compute device 110 and another compute device (e.g., a compute server 120, 122, 124, a storage server 130, 132, 134, management server 140, client device 144, such as to provide a fast path between client device 144 and redirector device 180, etc.). The communication circuitry 218 may be configured to use any one or more communication technology (e.g., wired or wireless communications) and associated protocols (e.g., Ethernet, Bluetooth®, Wi-Fi®, 4G, 5G, etc.) to implement such communication.

Communication circuitry 218 can include a network interface controller (NIC) 220, which may also be referred to as a host fabric interface (HFI). NIC 220 may be embodied as one or more add-in-boards, daughter cards, network interface cards, controller chips, chipsets, or other devices that may be used by compute device 110 to connect with another compute device (e.g., a compute server 120, 122, 124, a storage server 130, 132, 134, management server 140, client device 144, etc.). NIC 220 may be embodied as part of a system-on-a-chip (SoC) that includes one or more processors or included on a multichip package that also contains one or more processors. NIC 220 may include a local processor (not shown) and/or a local memory (not shown) that are both local to NIC 220. A local processor of NIC 220 may be capable of performing one or more of the functions of compute engine 210 described herein. Additionally, or alternatively, local memory of NIC 220 may be integrated into one or more components of compute device 110 at the board level, socket level, chip level, and/or other levels. NIC 220 can include redirector device 180.

Redirector device 180 may include a replicator logic unit 222, which may be embodied as any device or circuitry (e.g., a co-processor, an FPGA, an ASIC, etc.) configured to manage the replication (e.g., copying) of data sets among multiple data storage devices 224 (e.g., across multiple storage servers 130, 132, 134), including forwarding write requests to multiple downstream target devices (e.g., to other storage servers), detecting overlapping write requests (e.g., requests to write to the same logical block address (LBA)), coordinating application writes with replica resilvering, and ensuring that overlapping writes are performed to all replicas in the same order (resolving the overlap condition the same way everywhere). Resilvering can include making the contents of a replica of a storage device consistent with the device it replicates. That could be a new replica device, or one that somehow became inconsistent (e.g., because it was disconnected for a period of time). In some embodiments of system 100, one or more of redirectors devices 180 may be a standalone device (e.g., located between compute devices 110 rather than incorporated into a compute device 110).

Data storage devices 224 may be embodied memory devices and circuits, memory cards, hard disk drives, solid-state drives, or other data storage devices. Data storage device 224 may include a system partition that stores data and firmware code for the data storage device 224. Data storage device 224 may also include one or more operating system partitions that store data files and executables for operating systems. In cases where compute device 110 is a storage server 130, 132, 134, data storage devices 224 can store one or more of the data sets 160, 162, 164.

Data storage devices 224 can be composed of one or more memory devices or dies which may include various types of volatile and/or non-volatile memory. Access to data storage devices 224 can be consistent with any version or derivative of NVMe and/or the NVMe over Fabric (NVMe-oF) Specification, revision 1.1, published in June 2016 or earlier or later revisions or derivatives thereof.

Compute servers 120, 122, 124, storage servers 130, 132, 134, management server 140, and client device 144 are illustratively in communication via the network 142, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), 5G, etc.), a radio area network (RAN), digital subscriber line (DSL) networks, cable networks (e.g., coaxial networks, fiber networks, etc.), or any combination thereof.

In some examples, compute device 110, includes, but is not limited to, a server, a server array or server farm, a web server, a network server, an Internet server, a disaggregated server, a workstation, a mini-computer, a main frame computer, a supercomputer, a network appliance, a web appliance, a distributed computing system, multiprocessor systems, processor-based systems, or a combination thereof.

Figure 3:
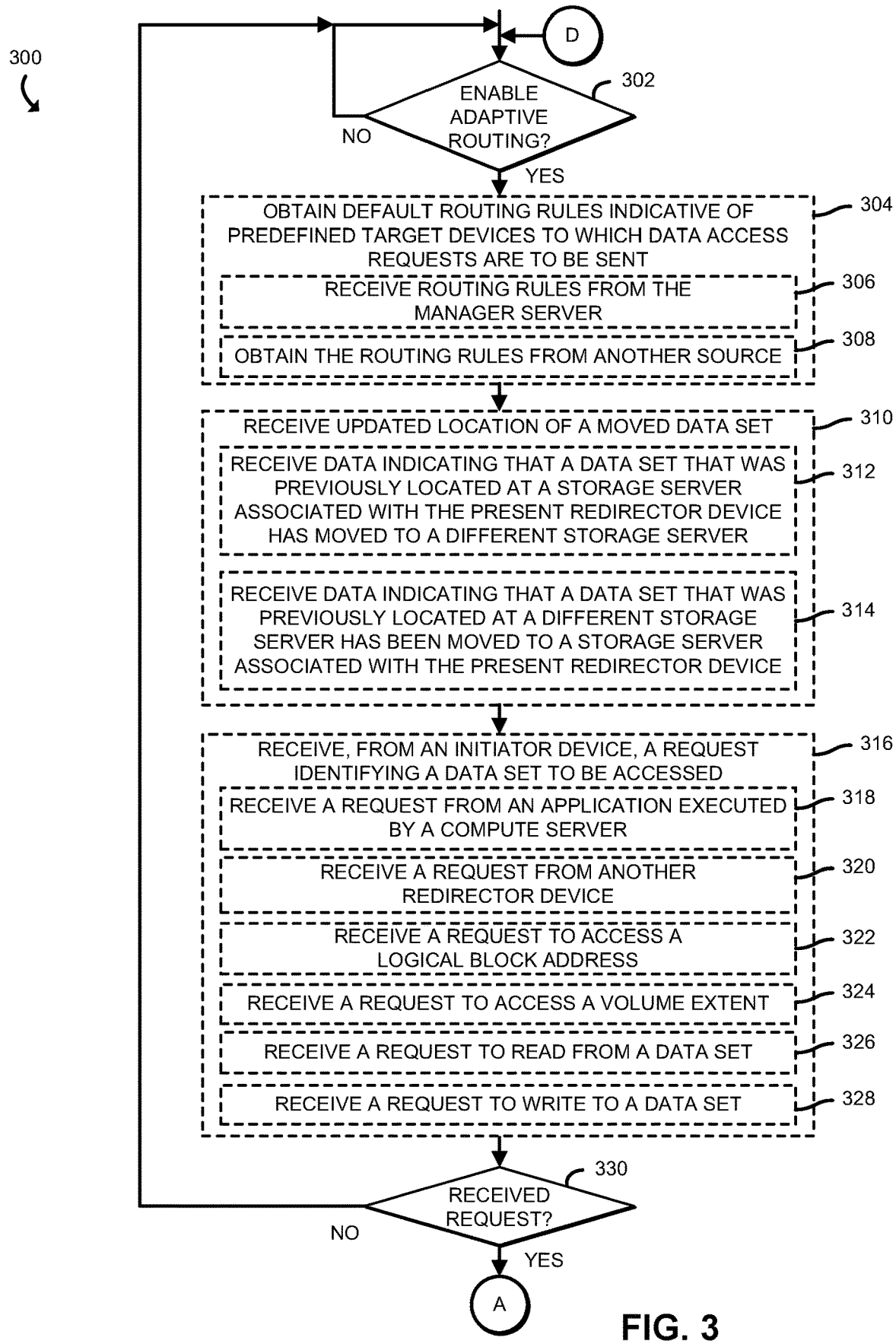
FIGS. 3-5 are flow diagrams of an embodiment of a method for providing distributed storage location hinting that may be performed with a redirector device of a compute device.

FIG. 3 depicts an example operation of a redirector device. At block 302, a redirector device can determine whether to enable adaptive routing of data access requests. Redirector device may determine to enable adaptive routing in response to perform a self-diagnostic and determining that the self-diagnostic has not detected any errors, in response to determining that other redirector devices are present in a system, and/or based on other factors. In response to a determination to enable adaptive routing, at block 304, the redirector device may obtain default routing rules indicative of predefined target devices to which data access requests are to be sent. In doing so, and as indicated in block 306, redirector device may receive the routing rules from a management server (e.g., through a network). Alternatively, and as indicated in block 308, redirector device may obtain the routing rules from another source, such as from a configuration file (e.g., present in a data storage device or in memory).

In block 310, redirector device may receive data (e.g., routing rules) indicative of an updated location of a data set that has been moved. In block 312, redirector device can receive data indicating that a data set that was previously located at a storage server (e.g., storage server) associated with the present redirector device has moved to a different storage server. Alternatively, as indicated in block 314, redirector device may receive data indicating that a data set that was previously located at a different storage server has been moved to a storage server (e.g., storage server) associated with the present redirector device.

As indicated in block 316, redirector device can receive, from an initiator device, a request that identifies a data set to be accessed. In doing so, and as indicated in block 318, redirector device may receive the request from an application executed by a compute server (e.g., from the compute engine) executing an application. As indicated in block 320, redirector device may receive the request from another redirector device (e.g., a redirector device included in another compute device). Additionally, as indicated in block 322, in receiving the request, redirector device may receive a request to access a specified logical block address (LBA). As indicated in block 324, the request may be to access an extent (e.g., a defined section) of a volume. An extent can include a grouping of blocks. The request may be a request to read from a data set, as indicated in block 326, or to write to a data set, as indicated in block 328. In block 330, redirector device can determine the subsequent course of action as a function of whether a request was received in block 316. If no request was received, method 300 loops back to block 302, in which redirector device determines whether to continue to enable adaptive routing. Otherwise (e.g., if a request was received), method 300 advances to block 332 of FIG. 4, in which redirector device determines whether the requested data set is available at a storage server associated with the present redirector device (e.g., whether redirector device is a component of storage server 130 on which the requested data set is stored).

Figure 4:
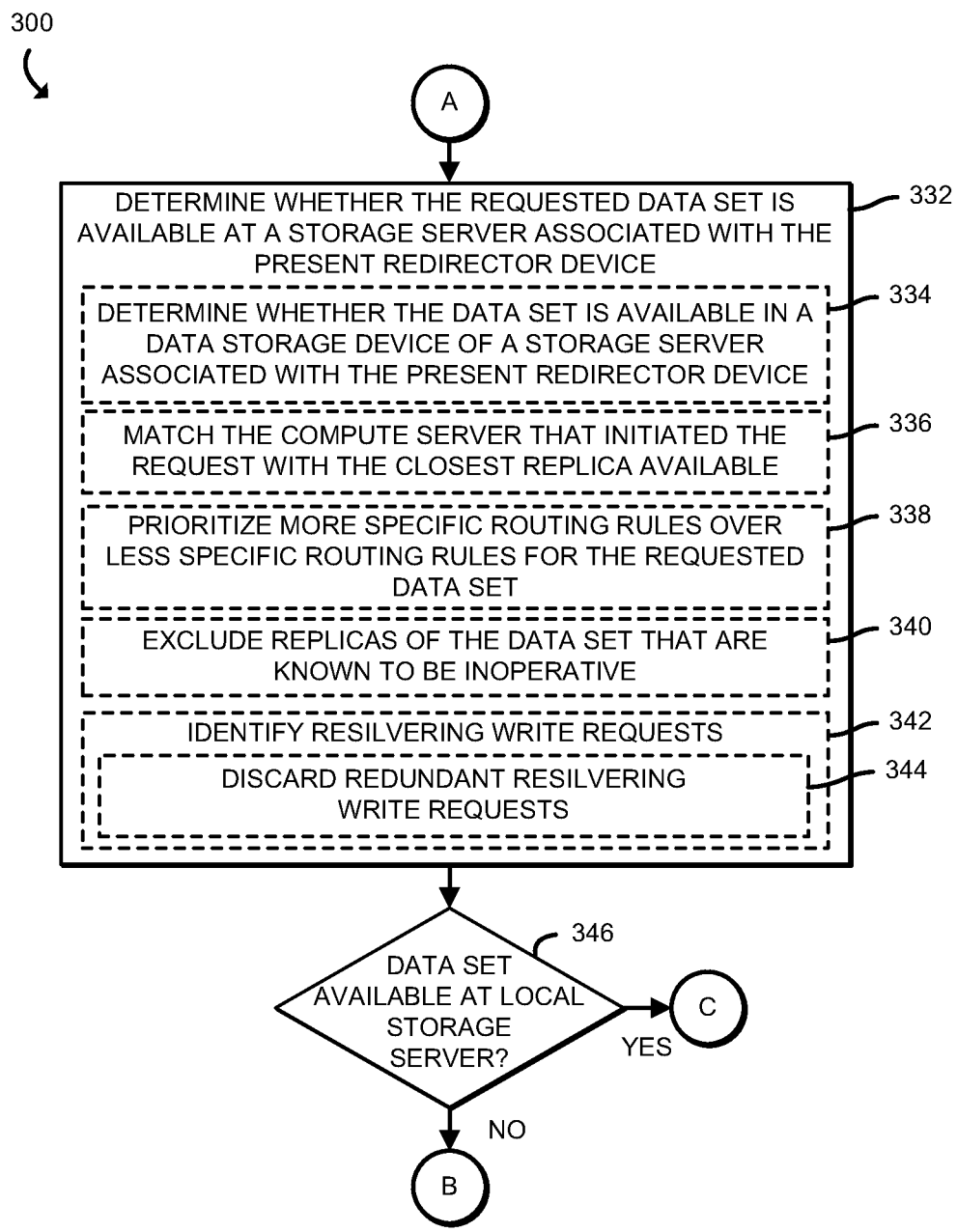

FIG. 4 depicts a process, including block 334, where redirector device in determining whether the requested data set is available on storage server, determines whether the data set is available in a data storage device of storage server. Further, in determining whether the requested data set is available at a storage server associated with the present redirector device, redirector device may additionally match an identity of compute server that initiated the request (e.g., a read request) with a replica of the data set that is closest (e.g., in the same physical rack rather than in another rack of the data center) to compute server, as indicated in block 336. If redirector device is not associated with (e.g., not a component of) the storage server having the closest replica of the data set for compute server that initiated the request, redirector device may determine that the requested data set is not available at the present storage server, even if the data set actually is stored in the present storage server.

As indicated in block 338, redirector device may prioritize more specific routing rules over less specific routing rules for the requested data set. For example, the routing rules may include one rule that indicates that requests associated with a particular range of logical block addresses or requests associated with a particular volume could generally be routed to redirector device in a storage server, while another routing rule specifies that requests to access a specific logical block address within that broader range, or a particular extent of the volume, could be sent to a storage server. In the above scenario, redirector device may select the second routing rule, as it is more specific and will provide a more direct route to the actual location of the requested data set. As indicated in block 340, redirector device can exclude from the selection of a target device (e.g., one or more storage server), any target device having a replica that is known to be inoperative (e.g., data storage device on which the replica is stored is malfunctioning). The redirector device may receive data regarding the operational status of an inoperative replica from one or more storage servers on which the replica is hosted (e.g., stored), from management server, or from another source (e.g., from another redirector device).

As indicated in block 342, redirector device may identify resilvering write requests (e.g., requests to write data to a replica that in the process of being created). In doing so, and as indicated in block 344, redirector device discards any redundant resilvering write requests (e.g., requests to write to the same logical block address). Subsequently, in block 346, redirector device determines the subsequent course of action based on whether the requested data set has been determined to be available at a local storage server (e.g., a storage server that redirector device is a component of). If not, method 300 advances to block 348 of FIG. 5, in which redirector device forwards the data access request to a downstream redirector device. Otherwise, method 300 advances to block 360 of FIG. 5, in which the redirector device accesses the requested data set in the storage server associated with the present redirector device.

Figure 5:
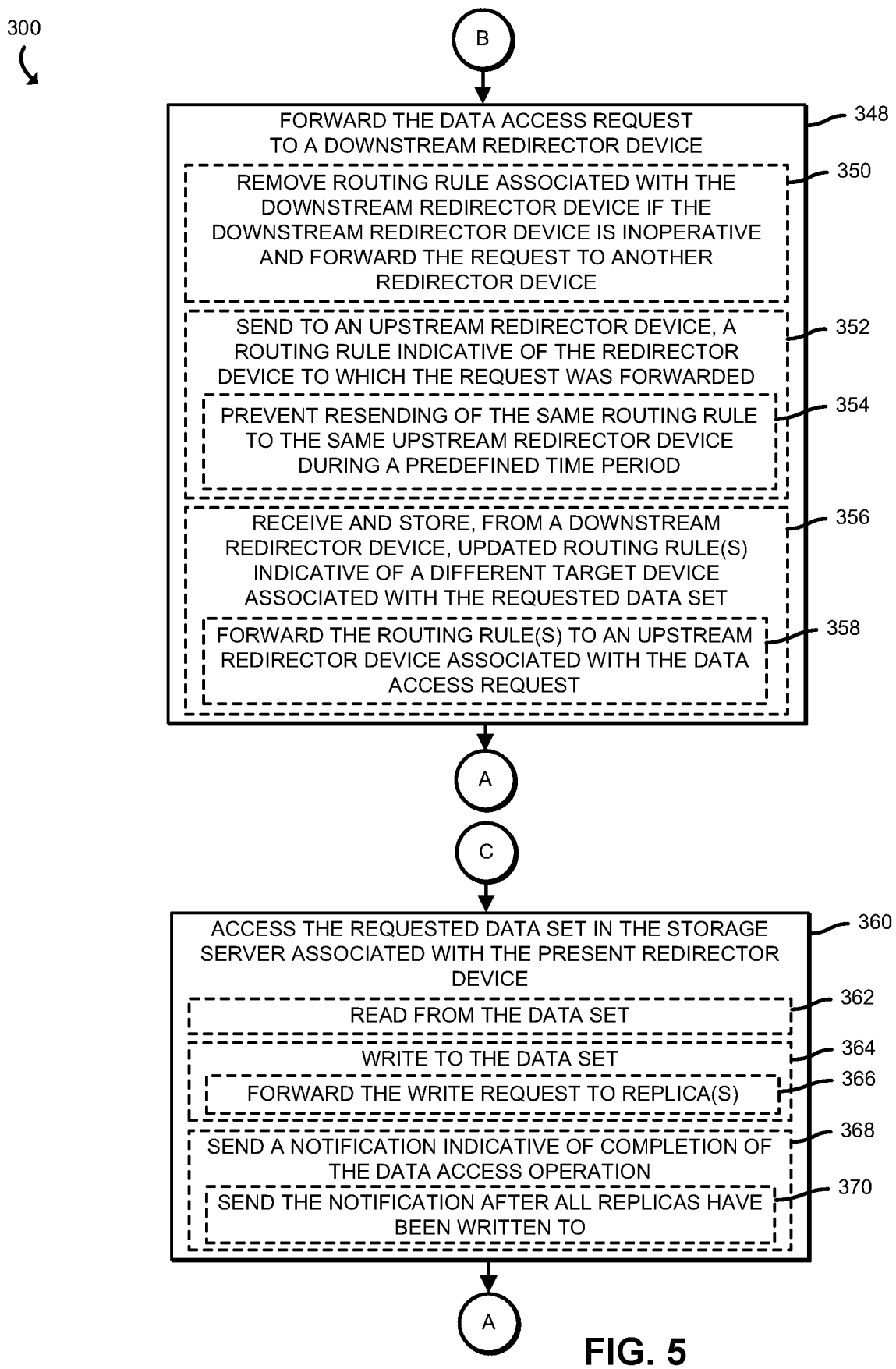

FIG. 5 depicts a process including forwarding the data access request to a downstream redirector device, the present redirector device may remove (e.g., delete) a routing rule associated with a downstream redirector device if that downstream redirector device is inoperative (e.g., unresponsive) and forward the data access request to another redirector device, as indicated in block 350. As indicated in block 352, redirector device may send, to an upstream redirector device (e.g., a redirector device that sent the request to the present redirector device), a routing rule indicative of the downstream redirector device to which the request was forwarded. In doing so, however, redirector device may suppress (e.g., prevent the resending of) a routing rule that was previously sent to the same upstream redirector device within a predefined time period (e.g., within the last X number of minutes), as indicated in block 354. As indicated in block 356, redirector device may receive and store, from a downstream redirector device, one or more updated routing rules indicative of a different target device associated with the requested data set (e.g., a different storage server or redirector device to which data access requests associated with the data set could be sent in the future). Further, and as indicated in block 358, redirector device, in the illustrative embodiment, may forward the routing rule(s) to an upstream redirector device associated with the data access request (e.g., that sent the data access request to the present redirector device). Subsequently, method 300 loops back to block 302 of FIG. 3, in which redirector device determines whether to continue to enable adaptive routing of data access requests.

If method 300 instead advanced to block 360 in which redirector device accesses the requested data set in storage server associated with the present redirector device, redirector device may read from the data set, as indicated in block 362, or may write to the data set, as indicated in block 364. In writing to the data set, redirector device may forward the write requests to one or more other storage servers (e.g., through one or more redirector devices) to write the same data to corresponding replicas hosted on those storage servers. As indicated in block 368, redirector device may send a notification (e.g., to an upstream device) indicating completion of the data access operation (e.g., read or write). In the case of a write, and as indicated in block 370, redirector device waits until all replicas have successfully been written to before sending the notification of completion. Subsequently, method 300 loops back to block 302 of FIG. 3, in which redirector device determines whether to continue to enable adaptive routing of data access requests.

FIGS. 3-4 have described a redirector in terms that could apply to any storage protocol. The following description discloses a redirector for storage devices supporting NVMe-oF. Recall that a redirector accepts block I/O requests for a logical block device and completes them to one of a number of alternative block devices according to an internal table (also known as a mapper). The destination for some I/O requests may be local storage devices. If an I/O request falls within a region the mapper determines to be remote, the redirector forwards the I/O request there and also sends a location hint back to the originator of the I/O request. A location hint is a message that identifies a range of blocks in a specific logical block device, and the address of a network storage device that is a destination for that I/O request than the redirector sending the hint. The originator could retain that location hint and send subsequent I/O requests for that region of the storage device to that destination directly.

Hosts (e.g., computer servers) could be extended as described herein can also simultaneously connect to standard and extended NVMe-oF subsystems. An unmodified NVMe-of host can access distributed storage through an extended NVMe-oF subsystem; but with lower performance than an extended host.

For example, a Linux™ Volume Manager (LVM) model, logical NVMe namespaces (LNs) can be mapped to physical NVMe namespaces (PNs) from a pool that spans many storage nodes. A PN can be any storage device with an NVMe or NVMe-oF interface. As with the LVM, the PNs can be divided into extents of some convenient size, and LNs can be mapped to a collection of PN extents to produce a LN of the desired size from available unallocated extents of PNs. LNs can be exposed to hosts as their provisioned block devices. Multiple storage subsystems can expose the same namespace, with the same namespace globally unique identifier (NSGUID)/EUI64, as defined in the NVMe-oF specification.

Storage location hinting posit the existence of a distributed volume manager (DVM) that persists the mapping of LNs to PNs or PN extents, can add or remove entries from the mappers of the redirectors at the PNs, and the initial hints given to hosts. Such systems use simple location hints. A storage location hint can include a message identifying an extent (e.gi., range of LBAs) of the LN, and a destination for that I/O request. That can include at least the storage subsystem NVMe qualified name (NQN) and may also contain an NSGUID (of another namespace), and an optional offset. A simple location hint may also specify whether it applies to reads, writes, or both.

Figure 6:
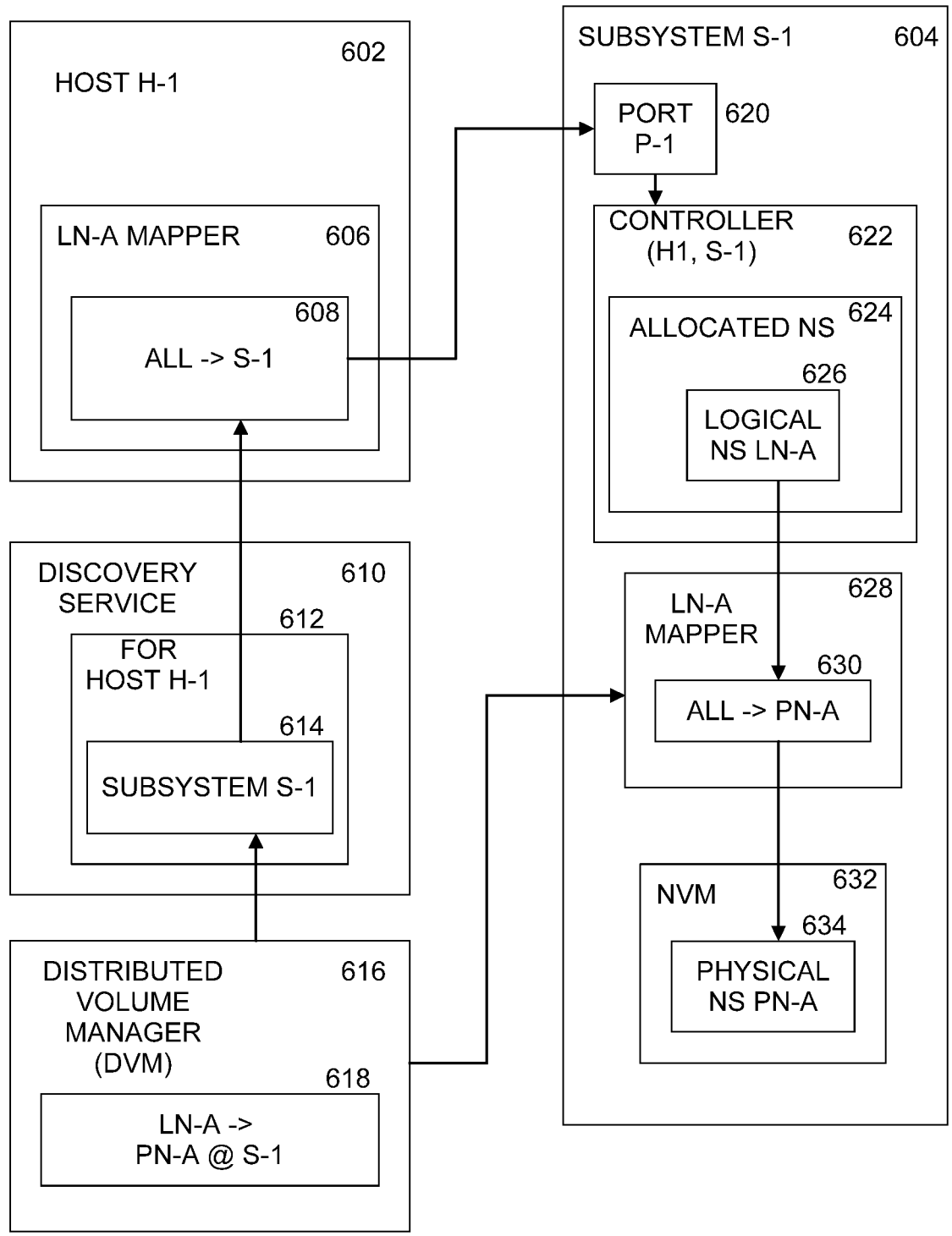
FIG. 6 is a diagram of a logical namespace mapped to a single physical namespace according to an embodiment.

An LN can be mapped to one or more PNs. FIG. 6 is a diagram 600 of a logical namespace mapped to a single physical namespace. Host H-1 602 can access a logical NVMe namespace, denoted LN-A, which is persisted in a single physical NVMe namespace, denoted PN-A, via port P-1 620 of storage subsystem S-1 604. In an embodiment, host H-1 602 is one of the computer servers 120, 122, 124, subsystem S-1 is one of the storage servers 130, 132, 134, and NVM 632 is one of data storage devices 224. NVM 632 includes physical network storage addresses PN-A 634.

The user in client device 144 can configure subsystem S-1 604 to be managed by distributed volume manager (DVM) 616, and the DVM knows which resources (such as ports, existing namespaces, unallocated NVM, etc.) in subsystem S-1 604 the DVM can use (shown as LN-A→PN-A at S-1 component 618). The user can configure the DVM to create logical addresses LN-A, with NSGUID G-A to be backed by physical addresses PN-A (possibly creating PN-A) in subsystem S-1. Here the DVM creates LN-A, so can also create an identifier for it. G-A is the NSGUID (namespace global identifier) for logical namespace LN-A. That is, causing the NVM (632) to create a new namespace, which becomes PN-A.

DVM 616 can populate LN-A mapper component 628 in subsystem S-1 604 to map incoming I/O requests for LN-A to local namespace (NS) PN-A (as shown by component 630). The DVM configures a Discovery Service (DS) component 610 to recognize host H-1 602 and add subsystem S-1 614 to the list of subsystems 612 Host H-1 can access. Host H-1 602 is configured to use the DS 610 managed by DVM 616, and to use the network storage with NSGUID G-A.

NVMe-oF discovery services can provide lists of NVMe-oF subsystems to the hosts that connect to them and make that query. This reveals information the host needs to establish those connections (addresses, ports, keys, etc.). The discovery service query response identifies subsystems, not the namespaces they may contain. Discovery services are free to recognize the hosts that connect to them and return different subsystem lists to different hosts. This is performed here so H-1 can be informed about the subsystems necessary to access LN-A, which in this example can be the LN that H-1 will have access to. NVMe-oF subsystems will return lists of namespaces they contain to connected hosts in response to standard NVMe-oF commands. Subsystems may not expose all namespaces to all hosts. H-1 can discover LN-A on S-1. PN-A, or LN-B (if that exists) would not be available to H-1.

Host H-1 602 can query the DS 610, and receive the connection information for subsystem S-1 614. Host H-1 602 gets connected to controller component 622 in subsystem S-1 604. A namespace may have a state of "Allocated." When hosts connect to controllers, the hosts enumerate the controllers and connect to one or all of them in the process of bringing up their local block devices. This is the same LN-A mentioned above. Because this subsystem is a redirector, and part of the distributed system managed by DVM 616, the subsystem exposes LN-A to at least H-1.

Through a series of Identify commands host H-1 602 enumerates the namespaces host H-1 can see in subsystem S-1 604. One of these could have NSGUID G-A (e.g., The NSGUID of LN-A). Host H-1 602 updates the host's mapper component for LN-A 606 to have subsystem S-1 as a default target (as shown in ALL→S-1 component 608). All I/O requests in host H-1 602 for LN-A are then sent to subsystem S-1 604. Accordingly, target nodes for particular memory access requests can be mapped in a network interface device.

Figure 7:
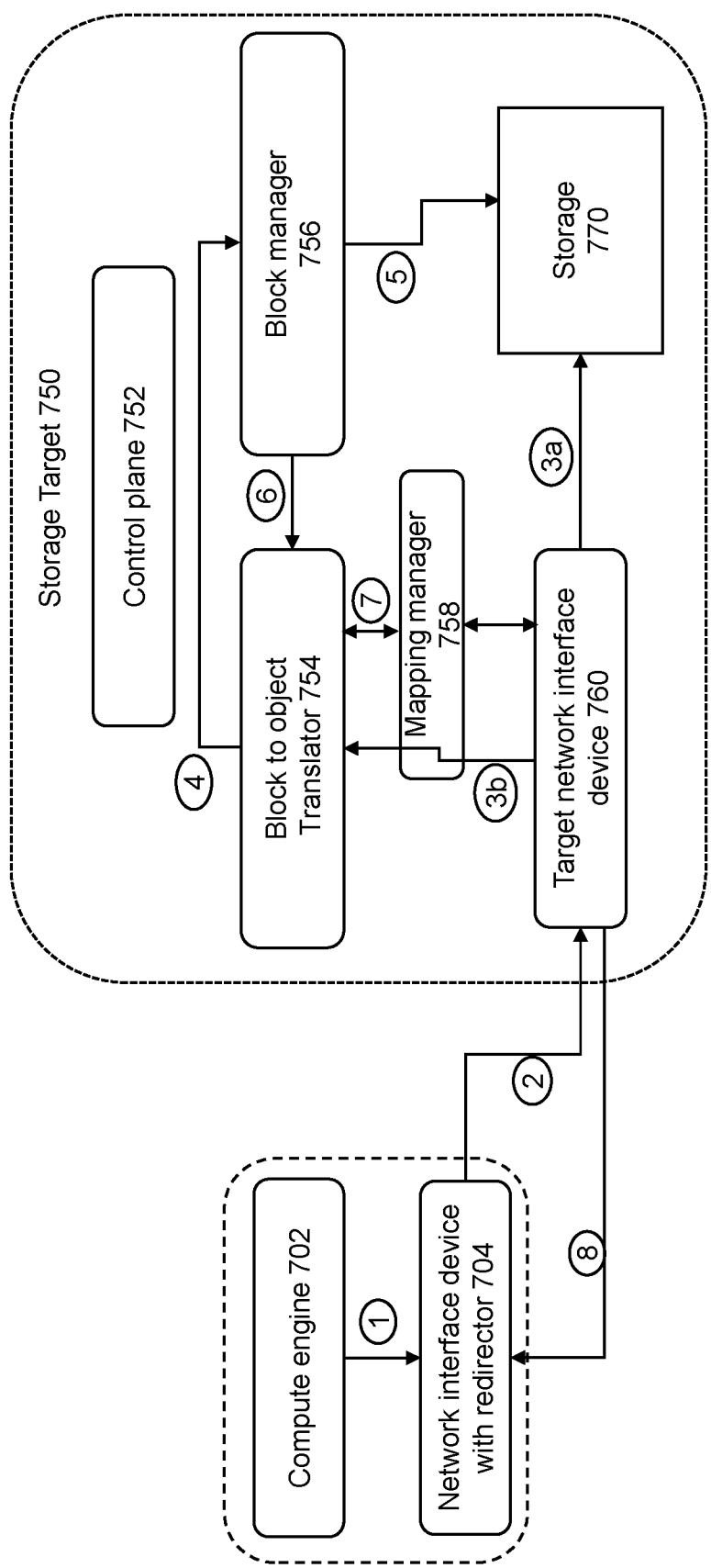
FIG. 7 depicts a system.

FIG. 7 depicts an example system. At a client node, a compute engine 702 can issue a request to read or write data. The request can identify one or more LBAs from which to read or to which to write data. For example, the request can be made to an NVMe storage device and received by network interface device with redirector 704. Redirector 704 can include one or more technologies of any redirector described herein. Redirector 704 can identify a particular storage target among multiple storage targets to which to send the request to read or write data, as described herein. In this example, the particular storage target is storage target 750. Network interface device with redirector 704 can transmit the request using an NVMe-oF connection to storage target 750. While a single storage target 750 is shown, multiple storage targets can be accessed by the network interface device and the multiple storage targets can be configured as storage target 750.

Storage target 750 can receive the request that identifies one or more target LBAs at target network interface device 760. Target network interface device 760 can be implemented as one or more of: network interface controller (NIC), SmartNIC, router, switch, forwarding element, infrastructure processing unit (IPU), or data processing unit (DPU). Target network interface device 760 can access mapping manager 758 to determine if a translation is stored in a look-up mapping table.

A mapping table can include one or more entries that translate a logical block address range to physical address and namespace (drive). Network interface device 760 can use this mapping table entry to determine a physical address and drive for subsequent accesses to a logical block address. For example, Table 1 shows an example format of a look-up mapping table from LBA range (e.g., starting address and length) to physical address. The mapping table of Table 1 can be used for a particular logical namespace such as LN-A or LN-B, described earlier. A memory access request can include a specified logical namespace (e.g., LN-A, LN-B, etc.). Note that instead of a physical address, a virtual address can be provided and virtual address-to-physical address translation can be performed. For example, an Input-Output Memory Management Unit (IOMMU) can be used to perform virtual address-to-physical address translation.

TABLE 1

| Logical block address | Length in LBA | Physical device | Physical address |
|---|---|---|---|
| 0 | 20 | Physical NameSpace-A | 200 |
| 25 | 1 | PN-A | 500 |
| 30 | 1 | memory | 0 × 1000 |
| . . . | | | |
| N | L1 | PN-B | 321 |

Another example mapping table is shown in Table 2. As shown in the example of Table 2, entries can span block ranges of a fixed size, where the span length is specified for the entire table. The mapping table of Table 2 can be used for a particular logical namespace such as LN-A or LN-B, described earlier.

TABLE 2

Example extent size = 32 blocks

| Logical block address | Physical device | Physical address |
|---|---|---|
| 0 | Physical NameSpace-A | 200 |
| 25 | PN-A | 500 |
| 30 | Memory | 0 × 1000 |
| . . . | | |
| N | PN-B | 321 |

If a subsequent request refers to an LBA range that fits within an existing entry in a mapping table, a linear interpolation can be performed within a span of the entry to determine a physical address range corresponding to the subsequent request. However, if a subsequent request refers to an LBA range that is not within an existing entry in the mapping table, a table miss can occur and determination of a translation from LBA to physical address range can be performed using object translator 754, as described next.

If the look-up mapping table does not include an entry of a translation from LBA to physical address range in storage 770, target network interface device 760 can access block-to-object translator 754 to convert an LBA to a physical address range. For example, LBA to physical address conversion can utilize Reliable Autonomic Distributed Object Store (RADOS) block device (RBD) library (librbd) in Ceph to translate a logical block address to physical address range. Rados protocol's librbd can convert an offset and range to an object identifier (e.g., object name). As an example, Ceph BlueStore can convert an object identifier to a physical address on physical drive or persistent memory in storage 770. An object can be associated with an identifier (e.g., OID), binary data, and metadata that includes a set of name/value pairs. An object can be an arbitrary size and stored within one or more blocks on storage 770. In some examples, an LBA can correspond to 512 bytes, although an LBA can include other numbers of bytes. After determination of a translation from LBA to physical address range, an entry for the determined translation can be stored in a mapping table. In some examples, where storage 770 includes a solid state drive (SSD), the physical address can be the LBA on the drive. In some examples, where storage 770 includes a byte-addressable memory, the address can be a virtual or physical address.

In some examples, where no mapping table is available, a conversion of a block address to physical address can cause creation of a mapping table for access by network interface device 760. In some examples, translation entries of the most frequently accessed LBAs from prior accesses can be pre-fetched into the mapping table.

In some examples, when network interface device 760 accesses a mapping of LBA to physical address and namespace, control plane 752 can be prevented from updating the mapping or the actual data when any ongoing requests are in-flight. To make modifications to entries of the mapping table, a mapping entry can be removed and the lock on the software metadata released.

In some examples, control plane 752 can invalidate entries in the mapping table or update entries in the mapping table if changes are made to translations of LBAs to physical addresses. Mapping entries used by network interface device 760 can be synchronized with the SDS control plane, as described herein, to attempt to prevent data movement when a data access is in process. For example, an LBA-to-physical address translation in an entry of a mapping table may be locked and not modified by other paths. When a modification of an LBA-to-physical address translation is to occur, an SDS can request to invalidate the entry in the table. On receiving an invalidation request, in-flight requests can be completed by network interface device 760, the entry removed from the table, and an acknowledgement (ACK) sent from network interface device 760 to SDS. The SDS can proceed with modification of an LBA-to-physical address translation after receiving an ACK that the entry invalidation was performed. Translation requests made after the modifying or invalidation request can be blocked until modification of the LBA-to-physical address translation is completed.

In some examples, mapping table entries can be removed from the mapping table based on a fullness level of the mapping table meeting or exceeding a threshold. To determine which LBA-to-physical address translation to evict or invalidate, priority-level based retention can be used, least recently used (LRU) entries can be evicted, and so forth.

After conversion from LBA to physical address, block manager 756 can send a write or read request to storage 770 using a device interface (e.g., Peripheral Component Interconnect express (PCIe) or Compute Express Link (CXL)). For a read request, block manager 756 can return the requested data and the information of physical NVMe namespace/blocks where the data resides.

An operation of the system using Ceph as an example Object Storge Daemon is described next. However, examples are not limited to use of Ceph and can utilize any object storage, such as Gluster, Minio, Swift, FreeNAS, Portworx, Hadoop, or others. At (1), a client application issues a block read I/O to a volume. Network interface device with redirector 704 can locate the remote storage target of the NVMe namespace for this client block I/O request using mappings populated via the hinting mechanism described herein. At (2), the redirector can cause the I/O to be sent as an NVMe request on NVMe-oF to the target server 750 in a storage cluster located by the redirector.

At (3), target network interface device 760 can look up the mapping between the NVMe request and a physical storage device to convert a block address to physical address. If a match is found, at (3a), target network interface device 760 can provide the I/O request with a physical address range directly to storage 770. If a match is not found, at (3b), target network interface device 760 can forward the I/O request to block to physical address translator running on a host in software or in a processor of target network interface device 760.

At (4), block-to-object translator 754 can convert the block request to a Ceph Object request and send the request to block manager 756 to convert the block request to a physical address access request using, for example, Ceph librbd. After conversion from block to physical address, at (5), block manager 756 can send the I/O request directly to target storage 770. At (6), block manager 756 can return the requested data (in a case of a read operation) and the information of physical NVMe namespace/blocks where the data resides.

At (7), a translation of the actual NVMe namespace/blocks for the block I/O request range can be stored as an entry in the mapping table to enable subsequent block I/O requests to the same LBA range to allow target network interface device 760 to access physical addresses of target storage 770 directly instead of using a translation service. For example, direct memory access (DMA) can be used to copy data from a target media. At (8), target network interface device 760 can send a response to the requester client.

Prior to or in response to receipt of a block I/O request, the network interface device can be programmed with mappings from logical volume/LBA range to physical namespace range and to access a mapping entry to convert logical volume/LBA range to physical namespace range. Programming the network interface device can occur using an interface (e.g., application program interface (API), command line interface (CLI), or configuration file). A block manager interface can provide a namespace and LBA range on a physical drive where the object (corresponding to a volume extent) is stored. Accordingly, when a network interface device includes a mapping of a block address to physical address, the network interface device for a storage target can intercept block requests and bypass an SDS control plane (e.g., volume shard manager) and provide block requests directly to a storage device.

Figure 8:
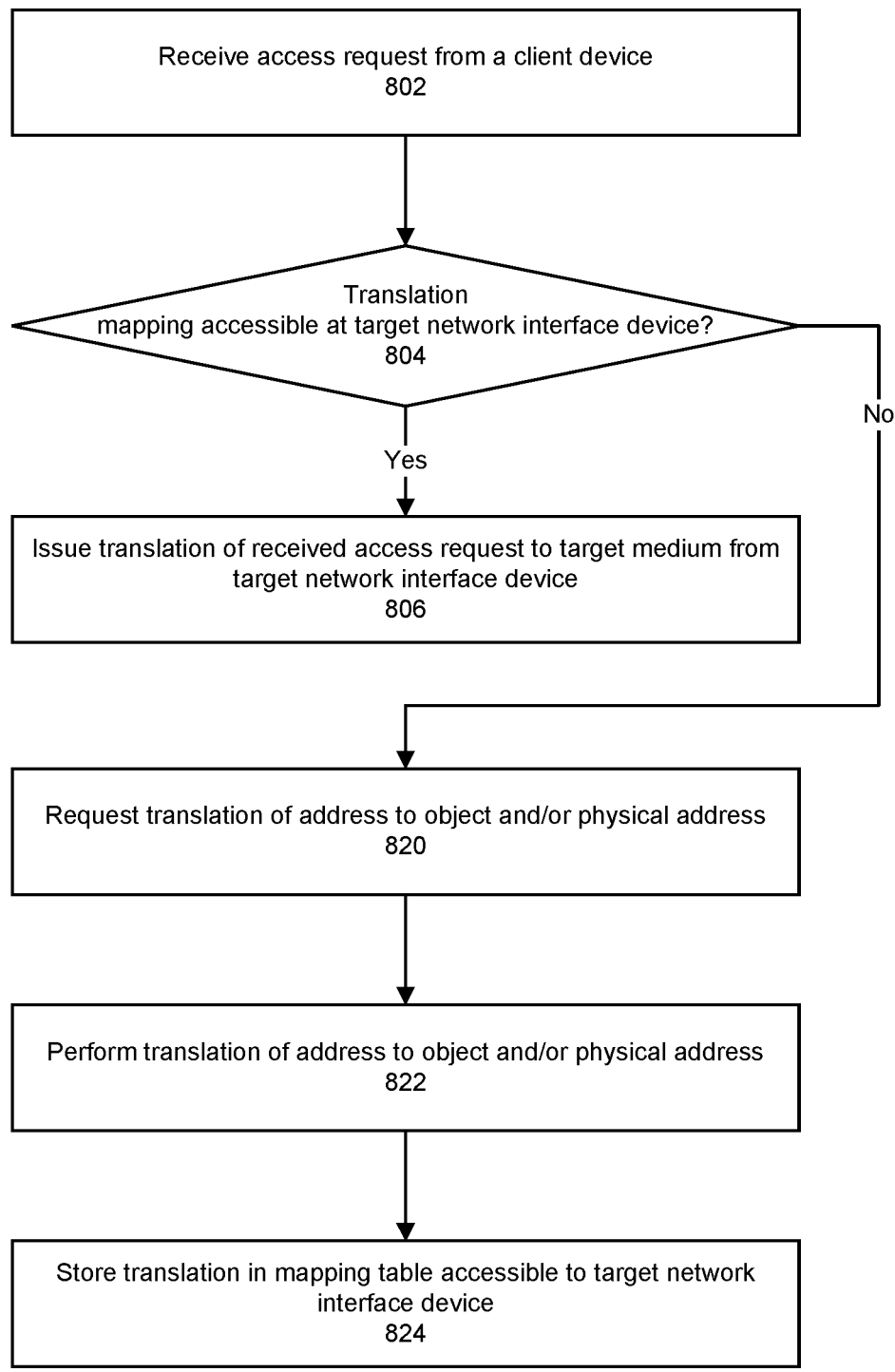
FIG. 8 depicts a process.

FIG. 8 depicts an example process that can be used in connection with I/O requests. At 802, a target network interface device can receive an access request from a client. The access request can include a read or write request for an LBA. The access request can be received using an NVMe-oF connection from a sender network interface device. At 804, the target network interface device can determine if a translation of the LBA to an object identifier and/or physical address in the target medium is available in a mapping table.

If the translation of the LBA to an object and/or physical address in the target medium is available in a mapping table, then the process can continue to 806. If the translation of the LBA to an object and/or physical address in the target medium is not available in a mapping table, then the process can continue to 820.

At 806, the target network interface device can issue a translation of the received access request to the target medium with the object identifier and/or physical address corresponding to the LBA. Where the access request is a write operation, data can be written to the target medium. Where the access request is a read operation, data can be read from the target medium and sent to an issuer of the access request.

At 820, the target network interface device can request a translation of the received LBA to an object identifier and/or physical address in the target medium. The translation can be performed using an SDS or other software executed by a processor in the target network interface device or a host system. At 822, the SDS or other software executed by a processor in the target network interface device or a host system can issue a translation of the access request to the target medium with the object identifier and/or physical address corresponding to the LBA. At 824, an entry corresponding to the translation can be stored in the mapping table for access by the target network interface device.

Figure 9:
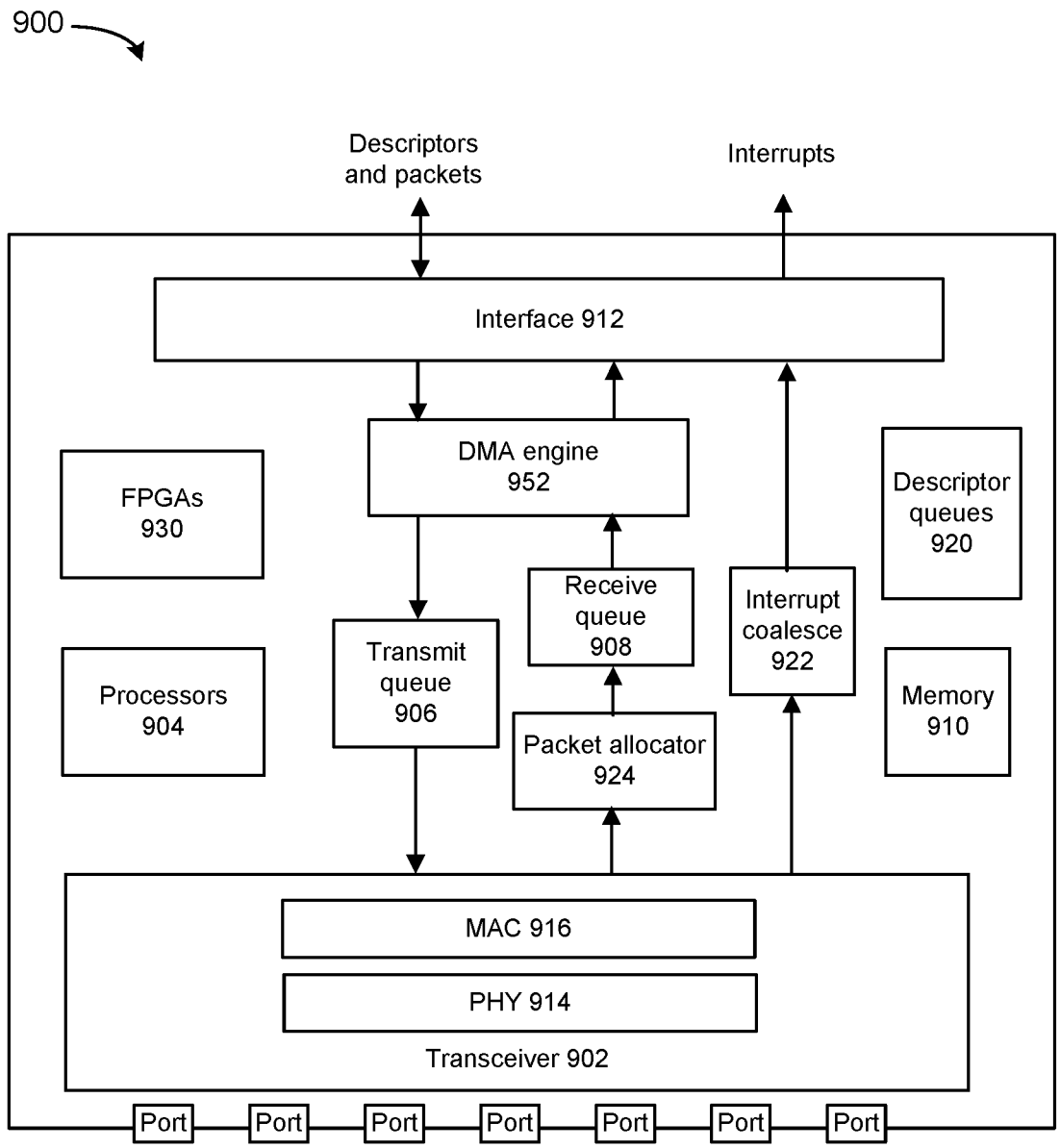
FIG. 9 depicts a network interface device.

FIG. 9 depicts a network interface. Various processor resources in the network interface can access a mapping table entry to perform an LBA to physical address conversion and update mapping table entries, as described herein. In some examples, network interface 900 can be implemented as a network interface controller, network interface card, network device, network interface device, a host fabric interface (HFI), or host bus adapter (HBA), and such examples can be interchangeable. Network interface 900 can be coupled to one or more servers using a bus, PCIe, CXL, or Double Data Rate (DDR) standards. Network interface 900 may be embodied as part of a system-on-a-chip (SoC) that includes one or more processors, or included on a multichip package that also contains one or more processors.

Some examples of network device 900 are part of an Infrastructure Processing Unit (IPU) or data processing unit (DPU) or utilized by an IPU or DPU. An xPU can refer at least to an IPU, DPU, graphics processing unit (GPU), general purpose GPU (GPGPU), or other processing units (e.g., accelerator devices). An IPU or DPU can include a network interface with one or more programmable pipelines or fixed function processors to perform offload of operations that could have been performed by a central processing unit (CPU). The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

Network interface 900 can include transceiver 902, processors 904, transmit queue 906, receive queue 908, memory 910, and bus interface 912, and DMA engine 952. Transceiver 902 can be capable of receiving and transmitting packets in conformance with the applicable protocols such as Ethernet as described in IEEE 802.3, although other protocols may be used. Transceiver 902 can receive and transmit packets from and to a network via a network medium (not depicted). Transceiver 902 can include PHY circuitry 914 and media access control (MAC) circuitry 916. PHY circuitry 914 can include encoding and decoding circuitry (not shown) to encode and decode data packets according to applicable physical layer specifications or standards. MAC circuitry 916 can be configured to perform MAC address filtering on received packets, process MAC headers of received packets by verifying data integrity, remove preambles and padding, and provide packet content for processing by higher layers. MAC circuitry 916 can be configured to assemble data to be transmitted into packets, that include destination and source addresses along with network control information and error detection hash values.

Processors 904 can be any combination of a: processor, core, graphics processing unit (GPU), field programmable gate array (FPGA), application specific integrated circuit (ASIC), or other programmable hardware device that allow programming of network interface 900. For example, a "smart network interface" or SmartNIC can provide packet processing capabilities in the network interface using processors 904.

Processors 904 can include a programmable processing pipeline that is programmable by P4, C, Python, Broadcom Network Programming Language (NPL), or x86 compatible executable binaries or other executable binaries. A programmable processing pipeline can include one or more match-action units (MAUs) that can be configured to access a mapping table entry to perform an LBA to physical address conversion, update mapping table entries, and provide access requests to an object storage, as described herein. Processors, FPGAs, other specialized processors, controllers, devices, and/or circuits can be used utilized for packet processing or packet modification. Ternary content-addressable memory (TCAM) can be used for parallel match-action or look-up operations on packet header content.

Packet allocator 924 can provide distribution of received packets for processing by multiple CPUs or cores using timeslot allocation described herein or receive side scaling (RSS). When packet allocator 924 uses RSS, packet allocator 924 can calculate a hash or make another determination based on contents of a received packet to determine which CPU or core is to process a packet.

Interrupt coalesce 922 can perform interrupt moderation whereby network interface interrupt coalesce 922 waits for multiple packets to arrive, or for a time-out to expire, before generating an interrupt to host system to process received packet(s). Receive Segment Coalescing (RSC) can be performed by network interface 900 whereby portions of incoming packets are combined into segments of a packet. Network interface 900 provides this coalesced packet to an application.

Direct memory access (DMA) engine 952 can copy a packet header, packet payload, and/or descriptor directly from host memory to the network interface or vice versa, instead of copying the packet to an intermediate buffer at the host and then using another copy operation from the intermediate buffer to the destination buffer.

Memory 910 can be any type of volatile or non-volatile memory device and can store any queue or instructions used to program network interface 900. Transmit queue 906 can include data or references to data for transmission by network interface. Receive queue 908 can include data or references to data that was received by network interface from a network. Descriptor queues 920 can include descriptors that reference data or packets in transmit queue 906 or receive queue 908. Bus interface 912 can provide an interface with host device (not depicted). For example, bus interface 912 can be compatible with PCI, PCI Express, PCI-x, Serial ATA, and/or USB compatible interface (although other interconnection standards may be used).

Figure 10:
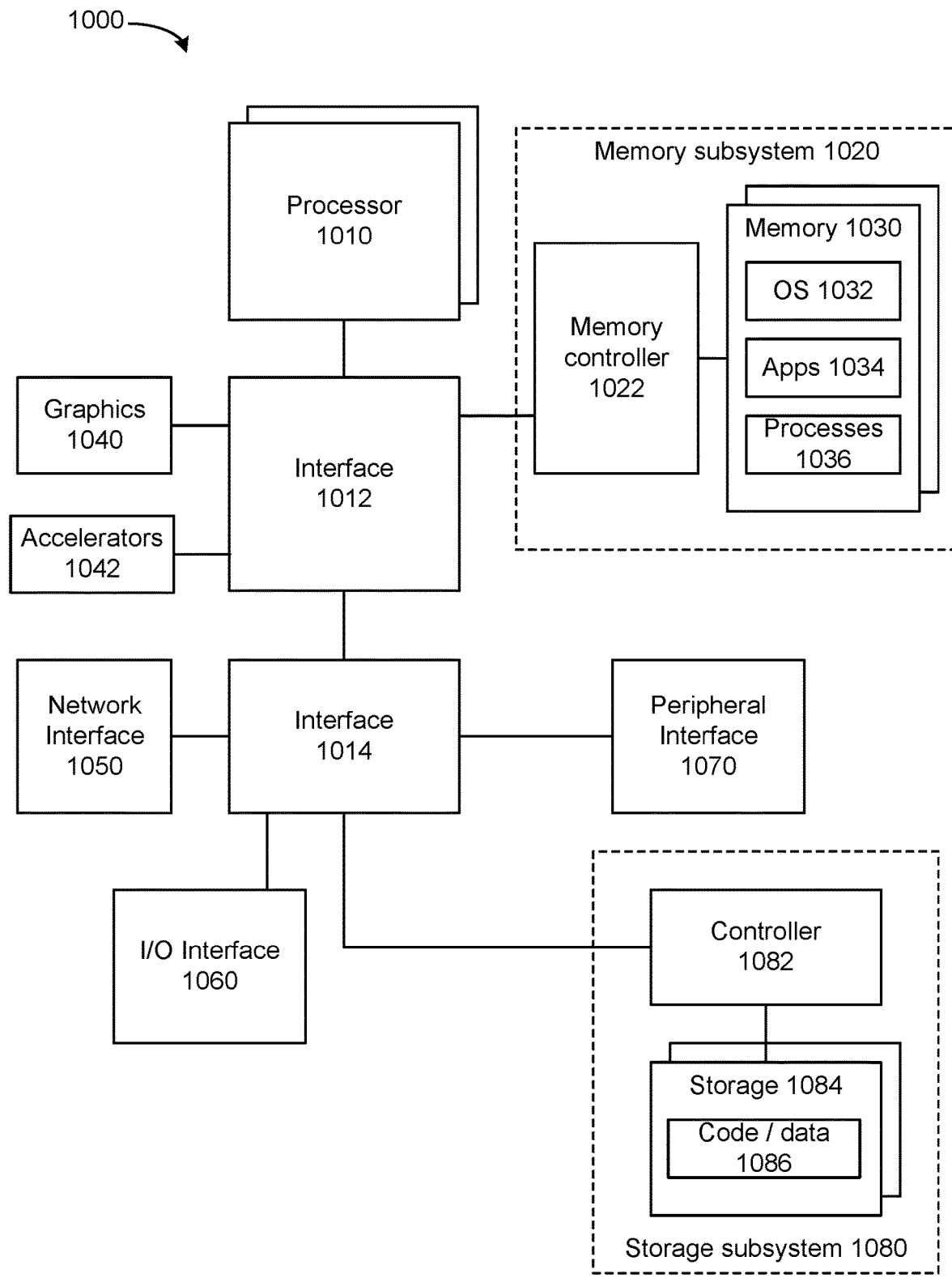
FIG. 10 depicts a system.

FIG. 10 depicts an example computing system. Various embodiments can use components of system 1000 (e.g., processor 1010, network interface 1050, and so forth) to provide access LBAs to an object storage device, with LBA to physical address conversion performed using a mapping table accessible to network interface 1050, as described herein. System 1000 includes processor 1010, which provides processing, operation management, and execution of instructions for system 1000. Processor 1010 can include any type of microprocessor, central processing unit (CPU), graphics processing unit (GPU), processing core, or other processing hardware to provide processing for system 1000, or a combination of processors. Processor 1010 controls the overall operation of system 1000, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 1000 includes interface 1012 coupled to processor 1010, which can represent a higher speed interface or a high throughput interface for system components that needs higher bandwidth connections, such as memory subsystem 1020 or graphics interface components 1040, or accelerators 1042. Interface 1012 represents an interface circuit, which can be a standalone component or integrated onto a processor die. Where present, graphics interface 1040 interfaces to graphics components for providing a visual display to a user of system 1000. In one example, graphics interface 1040 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 1040 generates a display based on data stored in memory 1030 or based on operations executed by processor 1010 or both. In one example, graphics interface 1040 generates a display based on data stored in memory 1030 or based on operations executed by processor 1010 or both.

Accelerators 1042 can be a fixed function or programmable offload engine that can be accessed or used by a processor 1010. For example, an accelerator among accelerators 1042 can provide compression (DC) capability, cryptography services such as public key encryption (PKE), cipher, hash/authentication capabilities, decryption, or other capabilities or services. In some embodiments, in addition or alternatively, an accelerator among accelerators 1042 provides field select controller capabilities as described herein. In some cases, accelerators 1042 can be integrated into a CPU socket (e.g., a connector to a motherboard or circuit board that includes a CPU and provides an electrical interface with the CPU). For example, accelerators 1042 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 1042 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 1020 represents the main memory of system 1000 and provides storage for code to be executed by processor 1010, or data values to be used in executing a routine. Memory subsystem 1020 can include one or more memory devices 1030 such as read-only memory (ROM), flash memory, one or more varieties of random access memory (RAM) such as DRAM, or other memory devices, or a combination of such devices. Memory 1030 stores and hosts, among other things, operating system (OS) 1032 to provide a software platform for execution of instructions in system 1000. Additionally, applications 1034 can execute on the software platform of OS 1032 from memory 1030. Applications 1034 represent programs that have their own operational logic to perform execution of one or more functions. Processes 1036 represent agents or routines that provide auxiliary functions to OS 1032 or one or more applications 1034 or a combination. OS 1032, applications 1034, and processes 1036 provide software logic to provide functions for system 1000. In one example, memory subsystem 1020 includes memory controller 1022, which is a memory controller to generate and issue commands to memory 1030. It will be understood that memory controller 1022 could be a physical part of processor 1010 or a physical part of interface 1012. For example, memory controller 1022 can be an integrated memory controller, integrated onto a circuit with processor 1010.

In some examples, OS 1032 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a CPU sold or designed by Intel®, ARM®, AMD®, Qualcomm®, IBM®, Texas Instruments®, among others. In some examples, a driver can configure network interface 1050 to provide access requests with LBAs to an object storage device using LBA to physical address translation, as described herein.

While not specifically illustrated, it will be understood that system 1000 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 1000 includes interface 1014, which can be coupled to interface 1012. In one example, interface 1014 represents an interface circuit, which can include standalone components and integrated circuitry. In one example, multiple user interface components or peripheral components, or both, couple to interface 1014. Network interface 1050 provides system 1000 the ability to communicate with remote devices (e.g., servers or other computing devices) over one or more networks. Network interface 1050 can include an Ethernet adapter, wireless interconnection components, cellular network interconnection components, USB (universal serial bus), or other wired or wireless standards-based or proprietary interfaces. Network interface 1050 can transmit data to a device that is in the same data center or rack or a remote device, which can include sending data stored in memory. Network interface 1050 can receive data from a remote device, which can include storing received data into memory.

In one example, system 1000 includes one or more input/output (I/O) interface(s) 1060. I/O interface 1060 can include one or more interface components through which a user interacts with system 1000 (e.g., audio, alphanumeric, tactile/touch, or other interfacing). Peripheral interface 1070 can include any hardware interface not specifically mentioned above. Peripherals refer generally to devices that connect dependently to system 1000. A dependent connection is one where system 1000 provides the software platform or hardware platform or both on which operation executes, and with which a user interacts.

In one example, system 1000 includes storage subsystem 1080 to store data in a nonvolatile manner. In one example, in certain system implementations, at least certain components of storage 1080 can overlap with components of memory subsystem 1020. Storage subsystem 1080 includes storage device(s) 1084, which can be or include any conventional medium for storing large amounts of data in a nonvolatile manner, such as one or more magnetic, solid state, or optical based disks, or a combination. Storage 1084 holds code or instructions and data 1086 in a persistent state (e.g., the value is retained despite interruption of power to system 1000). Storage 1084 can be generically considered to be a "memory," although memory 1030 is typically the executing or operating memory to provide instructions to processor 1010. Whereas storage 1084 is nonvolatile, memory 1030 can include volatile memory (e.g., the value or state of the data is indeterminate if power is interrupted to system 1000). In one example, storage subsystem 1080 includes controller 1082 to interface with storage 1084. In one example controller 1082 is a physical part of interface 1014 or processor 1010 or can include circuits or logic in both processor 1010 and interface 1014.

A volatile memory is memory whose state (and therefore the data stored in it) is indeterminate if power is interrupted to the device. Dynamic volatile memory uses refreshing the data stored in the device to maintain state. One example of dynamic volatile memory incudes DRAM (Dynamic Random Access Memory), or some variant such as Synchronous DRAM (SDRAM). An example of a volatile memory includes a cache. A memory subsystem as described herein may be compatible with a number of memory technologies, such as DDR3 (Double Data Rate version 3, original release by JEDEC (Joint Electronic Device Engineering Council) on Jun. 16, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of one or more of the above, or other memory.

A power source (not depicted) provides power to the components of system 1000. More specifically, power source typically interfaces to one or multiple power supplies in system 1000 to provide power to the components of system 1000. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 1000 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMB A) interconnect, OpenCAPI, Gen-Z, Infinity Fabric (IF), Cache Coherent Interconnect for Accelerators (COX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers.

These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes one or more examples, and includes an apparatus comprising: a network interface device comprising circuitry to: receive an access request with a target logical block address (LBA) and based on a target media of the access request storing at least one object, translate the target LBA to an address and access content in the target media based on the address.

Example 2 includes one or more examples, wherein the translate the target LBA to an address comprises: access a translation entry that maps the LBA to one or more of: a physical address or a virtual address.

Example 3 includes one or more examples, wherein the translate the target LBA to an address comprises: request a software defined storage (SDS) stack to provide a translation of the LBA to one or more of: a physical address or a virtual address and store the translation into a mapping table for access by the circuitry.

Example 4 includes one or more examples, and includes receive, prior to receipt of the access request, at least one entry comprising a translation entry that maps the LBA to one or more of: a physical address or a virtual address.

Example 5 includes one or more examples, wherein the network interface device comprises one or more of: network interface controller (NIC), SmartNIC, router, switch, forwarding element, infrastructure processing unit (IPU), or data processing unit (DPU).

Example 6 includes one or more examples, and includes a storage media communicatively coupled to the network interface device, wherein the storage media comprises the target media.

Example 7 includes one or more examples, and includes a host system communicatively coupled to the network interface device, wherein the host system is to provide to the network interface device at least one entry comprising a translation entry that maps the LBA to one or more of: a physical address or a virtual address.

Example 8 includes one or more examples, wherein the at least one entry is locked and unmodifiable and modification of the at least one entry comprises an invalidation of the at least one entry and addition of at least one other entry that maps the LBA to one or more of: a physical address or a virtual address.

Example 9 includes one or more examples, wherein the network interface device is to evict at least one entry based on one or more of: priority level, least recently used (LRU), or change in translation of an LBA to an address.

Example 10 includes one or more examples, and includes a method comprising: receiving, at a network interface device, an access request with a target logical block address (LBA) and based on a target media of the access request storing at least one object and a translation of the target LBA to an address being accessible to the network interface device, at the network interface device, translating the target LBA to an address and accessing content in the target media based on the address.

Example 11 includes one or more examples, wherein the access request comprises a write or read request.

Example 12 includes one or more examples, wherein the access request is received through a Non-Volatile Memory Express over Fabrics (NVMe-oF).

Example 13 includes one or more examples, wherein the translating the target LBA to an address and accessing content in the target media based on the address comprises: accessing a translation entry that maps the LBA to one or more of: a physical address or a virtual address.

Example 14 includes one or more examples, wherein the translating the target LBA to an address and accessing content in the target media based on the address comprises: requesting a software defined storage (SDS) stack to provide a translation of the LBA to one or more of: a physical address or a virtual address and storing the translation into a mapping table for access by the network interface device.

Example 15 includes one or more examples, and include receiving, prior to receipt of the access request, at least one entry comprising a translation entry that maps the LBA to one or more of: a physical address or a virtual address.

Example 16 includes one or more examples, wherein the network interface device comprises one or more of: network interface controller (NIC), SmartNIC, router, switch, forwarding element, infrastructure processing unit (IPU), or data processing unit (DPU).

Example 17 includes one or more examples, and includes a computer-readable medium comprising instructions stored thereon, that if executed by one or more processors, cause the one or more processors to: configure a network interface device, when operational, to: receive an access request with a target logical block address (LBA) and based on a target media of the access request storing at least one object, translate the target LBA to an address and access content in the target media based on the address.

Example 18 includes one or more examples, wherein the translate the access request to a format to access at least one object comprises: access a translation entry that maps the LBA to one or more of: a physical address or a virtual address.

Example 19 includes one or more examples, wherein the translate the access request to a format to access at least one object comprises: request a software defined storage (SDS) stack to provide a translation of the LBA to one or more of: a physical address or a virtual address and store the translation into a mapping table for access by the network interface device.

Example 20 includes one or more examples, and includes instructions stored thereon, that if executed by one or more processors, cause the one or more processors to: receive, prior to receipt of the access request, at least one entry comprising a translation entry that maps the LBA to one or more of: a physical address or a virtual address.

What is claimed is:

1. An apparatus comprising:
a network interface device comprising:
a direct memory access (DMA) circuitry,
a memory interface,
network interface, and
circuitry to:
receive an access request with a target logical block address (LBA) in one or more packets from a sender network interface device;
based on a target media of the access request storing at least one object, translate the target LBA to an address and access content in the target media based on the address, wherein the translate the target LBA to the address comprises access a translation entry that maps the LBA to one or more of: a physical memory address or a virtual memory address; and
provide, to the target media, the access request with the translation of the target LBA.

2. The apparatus of claim 1, wherein the translate the target LBA to an address comprises:
based on unavailability of a translation of the target LBA to the address:
request a software defined storage (SDS) stack to provide a translation of the LBA to one or more of: a physical memory address or a virtual memory address and
store the translation into a mapping table for access by the circuitry.

3. The apparatus of claim 1, comprising:
receive, prior to receipt of the access request, at least one entry comprising a translation entry that maps the LBA to one or more of: the physical memory address or the virtual memory address.

4. The apparatus of claim 1, wherein the network interface device comprises one or more of: network interface controller (NIC), SmartNIC, router, switch, forwarding element, infrastructure processing unit (IPU), or data processing unit (DPU).

5. The apparatus of claim 1, comprising:
a storage media communicatively coupled to the network interface device, wherein the storage media comprises the target media.

6. The apparatus of claim 1, comprising:
a host system communicatively coupled to the network interface device, wherein the host system is to provide to the network interface device at least one entry comprising the translation entry that maps the LBA to one or more of: the physical memory address or the virtual memory address.

7. The apparatus of claim 6, wherein
the at least one entry is locked and unmodifiable and
modification of the at least one entry comprises an invalidation of the at least one entry and addition of at least one other entry that maps the LBA to one or more of: the physical memory address or the virtual memory address.

8. The apparatus of claim 6, wherein the network interface device is to evict at least one entry based on one or more of: priority level, least recently used (LRU), or change in translation of the LBA to the address.

9. A method comprising:
receiving, at a network interface device, an access request with a target logical block address (LBA) in one or more packets from a sender network interface device;
at the network interface device, translating the target LBA to an address by accessing a translation entry that maps the LBA to one or more of: a physical memory address or a virtual memory address and accessing content in a target media based on the address; and
providing, to the target media, the access request with the translation of the target LBA.

10. The method of claim 9, wherein the access request comprises a write or read request.

11. The method of claim 9, wherein the access request is received through a Non-Volatile Memory Express over Fabrics (NVMe-oF).

12. The method of claim 9, comprising:
the network interface device:
requesting a software defined storage (SDS) stack to provide a translation of the LBA to one or more of: a physical memory address or a virtual memory address and
storing the translation into a mapping table for access by the network interface device.

13. The method of claim 9, comprising:
receiving, prior to receipt of the access request, at least one entry comprising the translation entry that maps the LBA to one or more of: the physical memory address or the virtual memory address.

14. The method of claim 9, wherein the network interface device comprises one or more of: network interface controller (NIC), SmartNIC, router, switch, forwarding element, infrastructure processing unit (IPU), or data processing unit (DPU).

15. At least one non-transitory computer-readable medium comprising instructions stored thereon, that if executed by one or more processors, cause the one or more processors to:
configure a network interface device, when operational, to:
receive an access request with a target logical block address (LBA) in one or more packets from a sender network interface device;
based on a target media of the access request storing at least one object, translate the target LBA to an address and access content in the target media based on the address, wherein the translate the access request to a format to access at least one object comprises: access a translation entry that maps the LBA to one or more of: a physical memory address or a virtual memory address; and
provide, to the target media, the access request with the translation of the target LBA.

16. The computer-readable medium of claim 15, wherein the translate the access request to the format to access at least one object comprises:
based on unavailability of a translation of the target LBA to the address:
request a software defined storage (SDS) stack to provide a translation of the LBA to one or more of: a physical address or a virtual address and
store the translation into a mapping table for access by the network interface device.

17. The computer-readable medium of claim 15, comprising instructions stored thereon, that if executed by one or more processors, cause the one or more processors to:
receive, prior to receipt of the access request, at least one entry comprising a translation entry that maps the LBA to one or more of: the physical memory address or the virtual memory address.

* * * * *